United States Patent [19]

Gordon

[11] Patent Number: 4,684,584
[45] Date of Patent: Aug. 4, 1987

[54] ELECTROCHEMICAL POWER GENERATION WITH THERMAL ELECTROLYTE MANAGEMENT

[75] Inventor: Arnold Z. Gordon, Lyndhurst, Ohio

[73] Assignee: Gould Inc., Rolling Meadows, Ill.

[21] Appl. No.: 864,869

[22] Filed: May 20, 1986

[51] Int. Cl.[4] .......................................... H01M 14/00
[52] U.S. Cl. ...................................... 429/51; 429/17; 429/15; 429/26
[58] Field of Search ..................... 429/51, 15, 19, 27, 429/101, 105, 26, 17; 423/198, 183, 179.5; 252/62.2

[56] References Cited

U.S. PATENT DOCUMENTS

| | | | |
|---|---|---|---|
| 2,940,820 | 6/1960 | Mazza et al. | 423/179.5 |
| 3,791,871 | 2/1974 | Rowley | 136/100 |
| 3,887,400 | 6/1975 | Doniat et al. | 429/51 |
| 4,207,297 | 6/1980 | Brown et al. | 423/179.5 |
| 4,485,154 | 11/1984 | Remick et al. | 429/15 |
| 4,528,248 | 7/1985 | Galbraith | 429/8 |

OTHER PUBLICATIONS

J. F. Cooper et al, "Lithium Requirements for Electric Vehicles Using Lithium-Water-Air Batteries", Nov. 12, 1975.

Primary Examiner—Brian E. Hearn
Assistant Examiner—Steven P. Marquis
Attorney, Agent, or Firm—Wood, Dalton, Phillips, Mason & Rowe

[57] ABSTRACT

A method of power generation and associated system therefor employing an electrochemical cell including a reactive metal anode, a cathode spaced from the anode and an electrolyte comprising an aqeuous solution of the hydroxide of the reactive metal is disclosed. The method of the invention utilizes the thermal coefficient of solubility of the metal hydroxide anode reaction product as a means by which electrolyte management is accomplished. The electrolyte, after passing through the electrochemical cell to generate electric power, is cooled to precipitate at least a portion of the reactive metal hydroxide. The precipitate is then separated from the electrolyte, thereby reducing the concentration of the reactive metal hydroxide in the electrolyte. The resulting electrolyte is then recirculated to the electrochemical cell.

22 Claims, 5 Drawing Figures

ELECTROCHEMICAL POWER GENERATION WITH THERMAL ELECTROLYTE MANAGEMENT

BACKGROUND OF THE INVENTION

1. Field of the Invention

This invention relates generally to power generation systems and, more particularly, this invention relates to electrochemical cells and methods for improving performance therein.

2. Description of Related Art

Electrochemical cells utilizing a reactive metal anode, an electrically conductive cathode, and an aqueous electrolyte are well known. Such cells are described in detail in numerous patents and publications, including Rowley U.S. Pat. No. 3,791,871 (Feb. 12, 1974) and Galbraith U.S. Pat. No. 4,528,248 (July 9, 1985), the respective disclosures of which are incorporated herein by reference.

The cell disclosed in the Rowley patent typifies prior electrochemical cells and utilizes a metal anode which is highly reactive with water and spaced from a cathode by an electrically insulating film formed on the anode in the presence of water. The anode and cathode are in contact with an aqueous electrolyte during cell operation. In the cell of the Rowley patent, the anode comprises an elemental alkali metal such as sodium or lithium, and the electrolyte comprises an aqueous solution of sodium hydroxide or lithium hydroxide, respectively, produced by the electrochemical reaction of the anodic metal with water.

The anode of the Rowley patent is coated with a thin film of a non-reactive, partially water soluble material which is not electrically conductive. The film is porous and allows transport of aqueous electrolyte to the anode and transport of reaction products away from the anode. Preferably, the film is the natural hydrated oxide which forms on the metal surface as it is exposed to humid air. However, other suitable water soluble insulators may serve as the film.

The electrolyte of the cell disclosed in the Rowley patent is preferably a hydroxide of the alkali metal utilized as the anode since such hydroxide is naturally formed during operation of the cell and hence the cell automatically regenerates the electrolyte during operation. Thus, in the Rowley cell, water is introduced to the cell at a restricted rate and brought into direct contact with both the cathode and the anode. The water dissolves a portion of the soluble film on the anode, resulting in the production of a hydrated hydroxide of the anode material, plus heat. As the reaction proceeds, useful electric power is produced.

The anode and the cathode are not in direct electrical contact with each other, but circuit connections are made at each electrode for drawing electric power from the cell.

The alkali metal of the anode is highly reactive with water. This reactivity, however, decreases as the concentration of the reactive metal hydroxide in the electrolyte increases. As the metal hydroxide concentration in the cell rises, the rate of power generation from the cell correspondingly diminishes, and passivation of the anode can occur if the electrolyte becomes saturated with the metal hydroxide. Thus, to maintain a desired level of power output from such electrochemical cells, relatively high concentrations of the reactive metal hydroxide should be avoided. Therefore, steps must be taken to maintain the reactive metal hydroxide concentration in the electrolyte at a level at which useful electrical current is produced. Optimally (at typical operating temperatures), the concentration of the metal hydroxide in the electrolyte is maintained at about 80% of saturation for the electrolyte.

One solution to the problem of too great a concentration of the reactive metal hydroxide in the electrolyte is the continuous expulsion of a fraction of the electrolyte stream into the surrounding environment, and the simultaneous injection of a similar flow rate of fresh water into the electrolyte. If the stream input and output are kept balanced and prorated by metal hydroxide production, this technique is effective.

While effective in reducing the concentration of the reactive metal hydroxide in the electrolyte, such a technique suffers from several disadvantages. First, the motion of the inlet and outlet flow streams results in significant noise levels and the noise generated may exceed desired and/or tolerable noise limits. Second, the technique requires a continuous source of fresh feed water. For non-marine applications, there is no such ready source of inlet water and even if such inlet water were carried on board, its weight would, for most uses, be prohibitive. Accordingly, such closed loop electrochemical cells require some form of "electrolyte management", i.e., removal of reactive metal hydroxide from the circulated electrolyte.

SUMMARY OF THE INVENTION

It is an object of the invention to overcome one or more of the problems described above.

According to the present invention, a method of power generation having an electrochemical cell including a reactive metal anode, a cathode spaced from the anode to define a reaction zone and an electrolyte comprising an aqueous solution of the hydroxide of the reactive anodic metal is provided. Electric power is generated by flowing the electrolyte through the reaction zone and then cooling the electrolyte to precipitate at least a portion of the reactive metal hydroxide. At least a portion of the precipitate is then separated from the electrolyte, thus reducing the hydroxide concentration of the electrolyte. The resulting electrolyte is recirculated to the cell reaction zone for continuous and efficient cell operation.

In addition, the invention comprehends corresponding systems for power generation.

Other objects and advantages of the invention will be apparent to those skilled in the art from the following detailed description taken in conjunction with the drawings and appended claims.

DETAILED DESCRIPTION OF THE INVENTION

According to the invention, a power generation system, and a method of power generation and electrolyte management in aqueous/reactive metal electrochemical cells is provided. The invention contemplates a system for power generation having an electrochemical cell with a lithium or other reactive metal anode. The present invention may be used with any configuration of cell which operates to produce the hydroxide of the anodic metal in an aqueous electrolyte. The cell typically includes a reactive metal anode, a cathode spaced from the anode to define a reaction zone therebetween and an aqueous electrolyte (with or without additives).

Lithium is a preferred anodic material because of its high energy density. Other reactive metals, such as other alkali metals, for example, may be used. The metal of the anode may be present in elemental, compound, alloy, amalgam or mixture form, as desired. Reference herein to the preferred lithium is exemplary only, and the invention is understood to encompass the use of other reactive metals.

An electrochemical reaction occurs at the anode, as is well known, to produce a cation of the anodic metal, and an electron. The anodic cation reacts with the negatively charged ionic specie (typically hydroxide ion) in the electrolyte to form an anodic reaction product, typically lithium hydroxide (LiOH) in the case of a lithium anode.

As is well known in the art, alkali metal anodes are coated with a water-soluble, metal ion permeable insulating coating of the hydrated hydroxide of the anodic metal. This coating naturally forms on the anode upon exposure of the anode to humid air and acts to modulate the electrochemical reaction.

The metal hydroxide coating on the anode typically effects spacing between the anode and cathode, which may be in physical contact, but not direct electrical contact with each other. As is well known in the art, however, other physical spacers, such as foam, screen, beads or combinations thereof, may be present.

Figure 1:
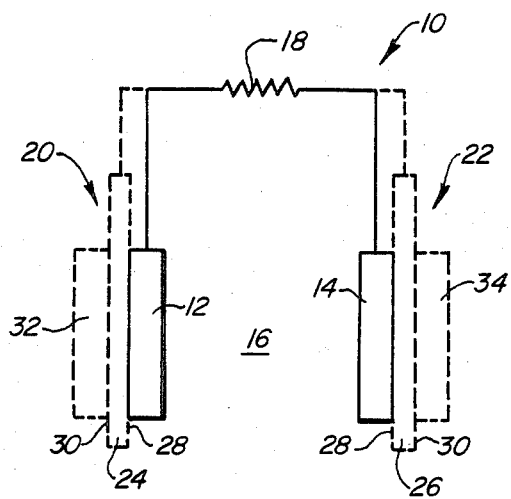
FIG. 1 is a schematic depiction of an electrochemical cell according to a typical embodiment of the invention.

FIG. 1 is a schematic depiction of an electrochemical cell 10 according to a typical embodiment of the invention. The cell 10 includes an anode 12 and a cathode 14 spaced from the anode 12 so as to define a flow channel 16. The anode 12 and the cathode 14 are each connected to a load 18.

It is to be understood that bipolar electrodes, such as those shown in phantom in FIG. 1, may be used in the practice of the invention. The bipolar electrodes 20 and 22 each include a substrate current collector 24 and 26, respectively. Disposed on opposed faces 28 and 30 of each of the current collectors 24 and 26 are an anode and a cathode, i.e., the anode 12 and a cathode 32 and the cathode 14 and an anode 34, respectively. With such bipolar electrodes, the substrate current collectors 24 and 26, respectively, are attached to the load 18.

The invention utilizes the large entropy driven thermal coefficient of solubility which may be created in the electrolyte flowing in the cell, e.g., flowing through the flow channel 16. The solubility of the anode product is controlled by the following equation:

$$G = H - TS \qquad (1)$$

wherein G is the Gibbs energy of solvation of the anode product, S is the entropy of the anode product and T is the temperature of the system.

In accordance with the equation (1), the thermal slope of solubility of the lithium hydroxide in electrolyte is simply the value of the entropy of the process. This slope is such that at higher temperatures the value of G is more negative and therefore the anode product is more soluble in the electrolyte. This in turn permits the management of the electrolyte by way of controlling the temperature of the electrolyte.

The principle known as the common-ion effect may be utilized in order to accentuate the thermal solubility of the lithium hydroxide in the electrolyte. According to the common-ion effect principle, the degree of ionization of a compound is lowered when another ionizable compound, i.e., a common ion agent, is added to the solution. The common ion agent has an ion common with the compound for which lowering the degree of ionization is sought. Thus, a common ion agent which is effective in lowering the degree of ionization of lithium hydroxide in electrolyte may have either a common cation, i.e., the lithium cation, or a common anion, i.e., the hydroxide anion. Examples of common ion agents useful in the practice of the invention include lithium chloride and sodium hydroxide.

Figure 2:
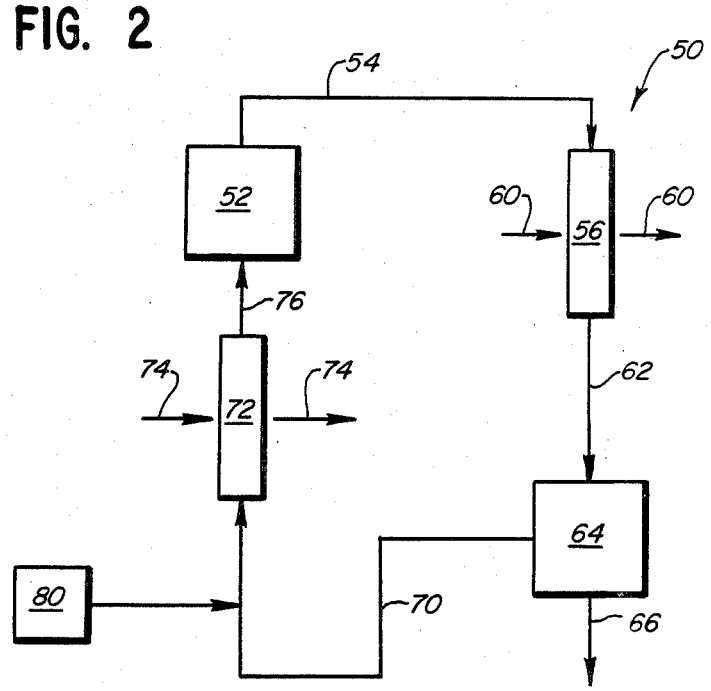
FIG. 2 is a schematic flow diagram of a system for electrochemical power generation according to a typical embodiment of the invention.

Referring to FIG. 2, a system, generally designated 50, for electrolyte management is shown. The system 50 includes a cell stack 52 comprising a plurality of reactive metal anode electrochemical cells. (It is to be understood, however, that the invention may also be practiced with an individual electrochemical cell, for example, the cell 10 of FIG. 1.)

The electrochemical cells in the cell stack 52 are operated at a relatively high temperature. The electrolyte stream, designated 54, containing dissolved anode product therein, is circulated from the cell stack 52 through a heat exchanger 56. The heat exchanger 56 removes heat from the stream 54 by indirectly contacting the stream 54 with a cooling stream 60 of air or water passing through the heat exchanger 56.

A cooled electrolyte flow stream 62 exits the heat exchanger 56 and is passed to an electrolyte reservoir/anode product separator 64 wherein anode product is separated from the electrolyte in a stream 66. For example, separation of the anode product from the electrolyte may be accomplished by centrifugation utilizing a centrifuge or filtration utilizing a filtering apparatus.

The resulting electrolyte flow stream, designated 70, is circulated from the electrolyte reservoir/anode product separator 64 through a heat exchanger 72. The heat exchanger 72 heats the electrolyte stream 70 by indirectly contacting the stream 70 with a heating stream 74 of air or water passing through heat exchanger 72.

A heated electrolyte flow stream 76 exits the heat exchanger 72 and is passed to the cell stack 52.

The electrolyte passing through the heat exchanger 72 and subsequently through the cell stack 52 may be initially provided from an electrolyte reservoir 80, and recycled electrolyte, i.e. the stream 70, may be supplemented with electrolyte from the reservoir 80, as required.

Figure 3:
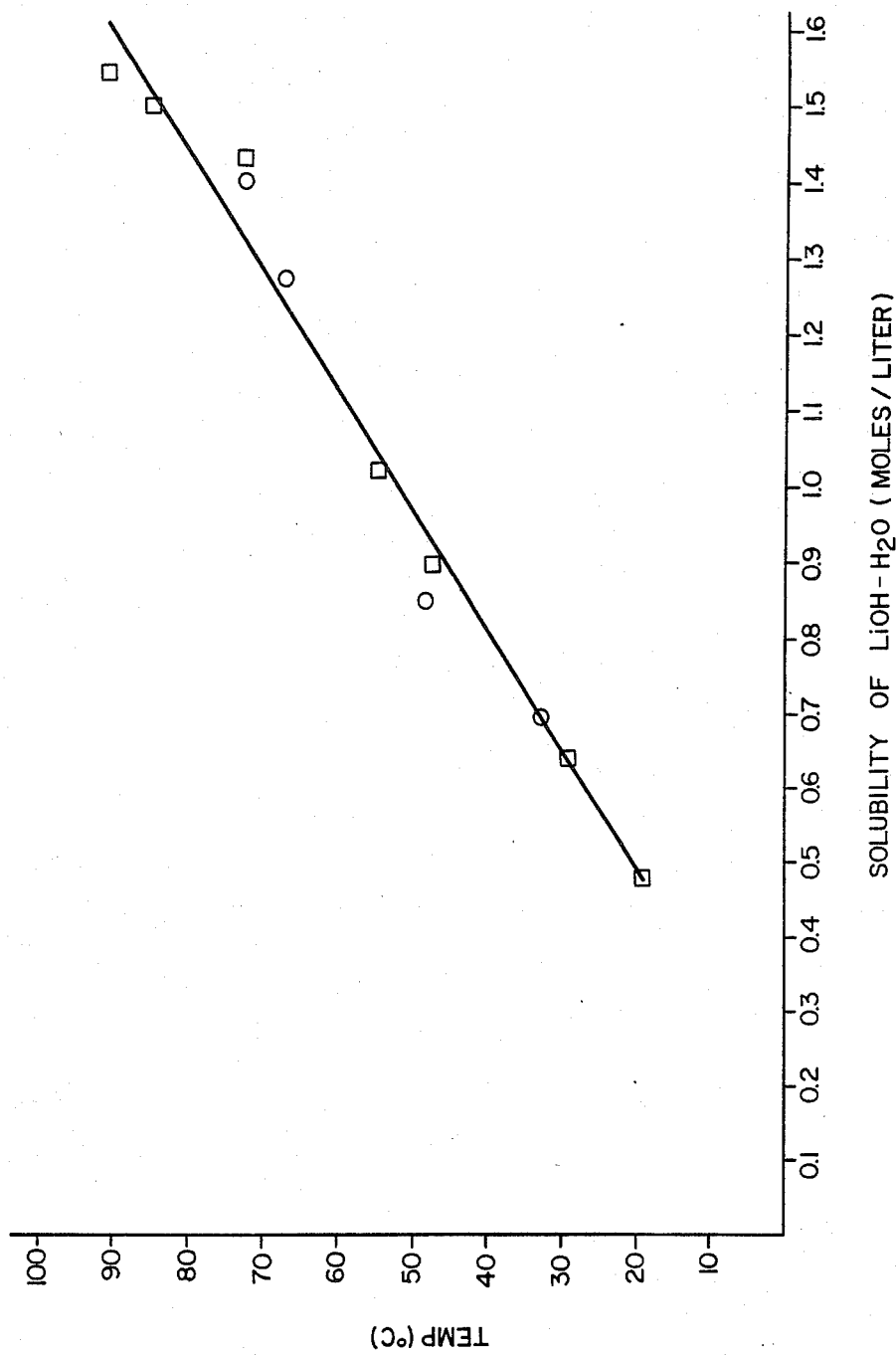
FIG. 3 is a graphical depiction of temperature vs. solubility of $LiOH \cdot H_2O$ in 10M NaOH.
Figure 4:
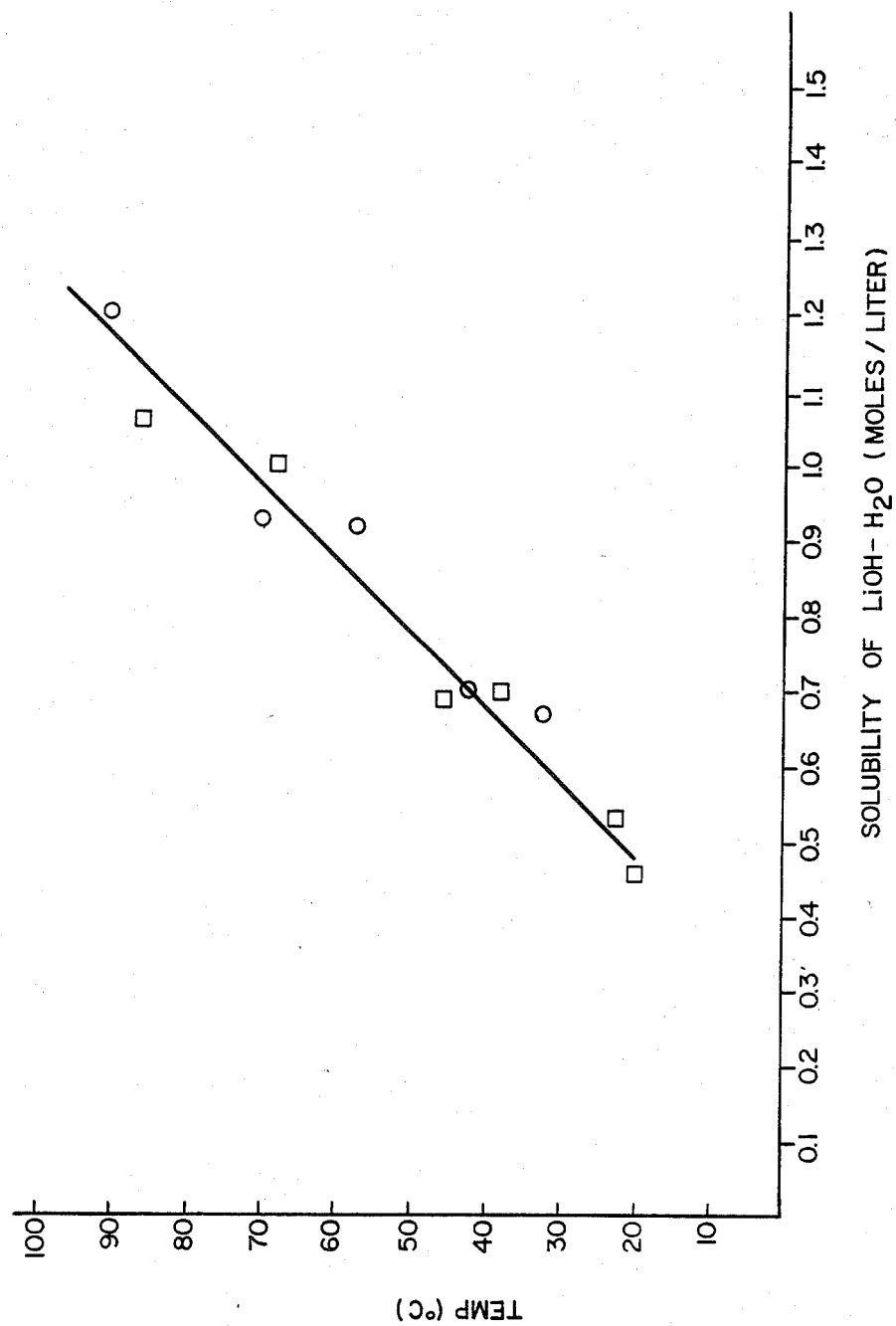
FIG. 4 is a graphical depiction of temperature vs. solubility of $LiOH \cdot H_2O$ in 15M NaOH.
Figure 5:
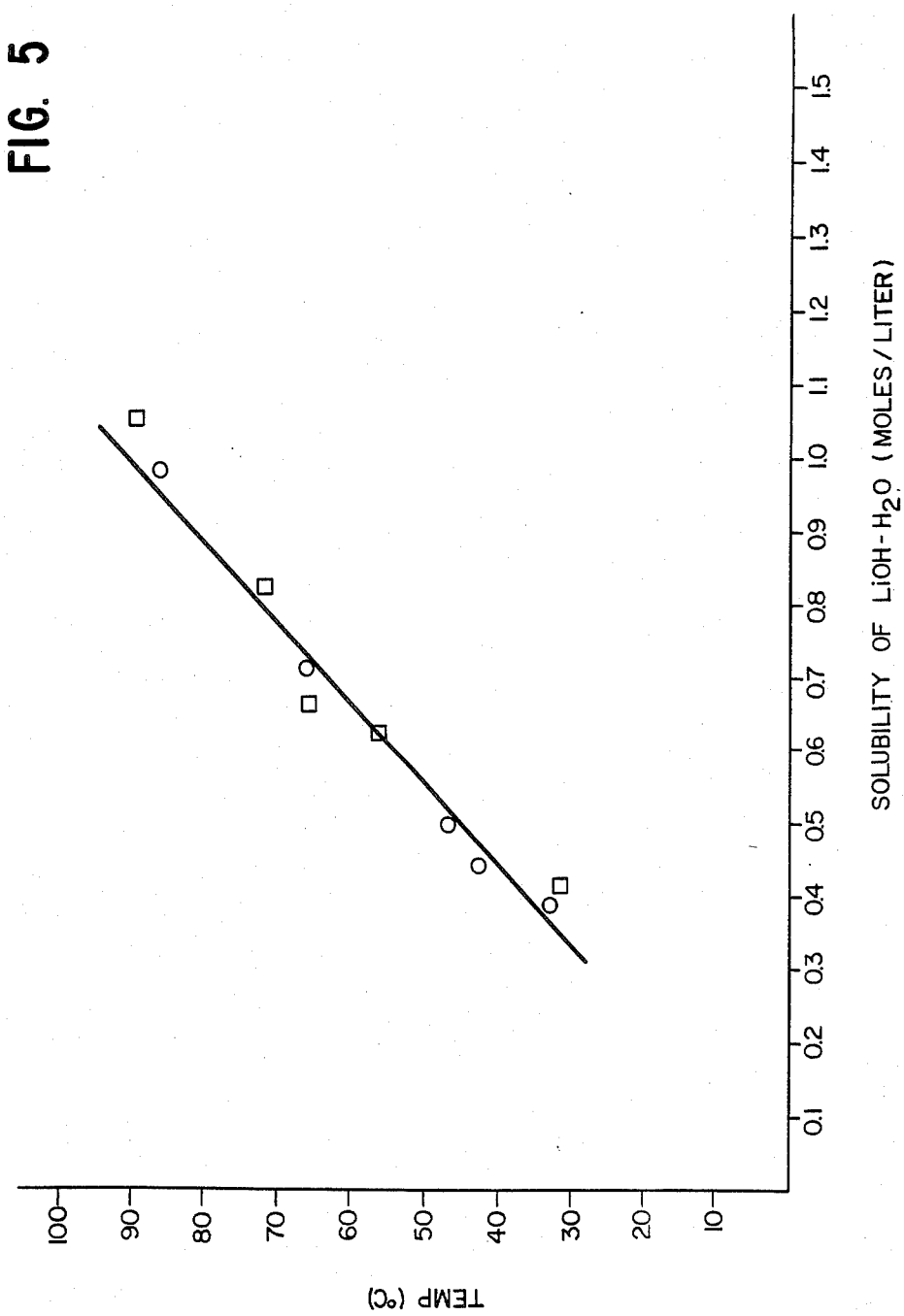
FIG. 5 is a graphical depiction of temperature vs. solubility of $LiOH \cdot H_2O$ in 20M NaOH.

FIGS. 3-5 (wherein a □ indicates a value obtained while increasing the temperature and a O indicates a value obtained while decreasing the temperature) illustrate the technical feasibility of the use of the thermal coefficient of solubility of the metal hydroxide anode reaction product as a means by which electrolyte management is accomplished. FIG. 3 depicts temperature v. solubility for LiOH·H₂O in 10M NaOH. FIG. 4 depicts temperature v. solubility for LiOH·H₂O in 15M NaOH. FIG. 5 depicts temperature v. solubility for LiOH. H₂O in 20M NaOH.

The figures show that in aqueous solutions of the much more soluble sodium hydroxide, the solubility of the lithium hydroxide varies sharply with temperature and sodium hydroxide concentration.

Comparing FIGS. 3 and 4, it is evident that the slope of the line (i.e., the change in temperature/change in solubility of LiOH·H₂O) increases as the concentration of the common ion agent, i.e. NaOH, is increased from 10M to 15M.

FIGS. 4 and 5 show a general leftward shifting of the temperature v. solubility graph when the concentration of NaOH was increased from 15M to 20M. Thus, in accordance with the invention, electrolyte management is accomplished by running the electrochemical cell at a relatively high temperature and then collecting the anode product by cooling the electrolyte stream to a relatively low temperature before recycling the electrolyte to the electrochemical cell or cell stack.

In general, aqueous solutions of sodium hydroxide wherein the concentration of sodium hydroxide is in the range of about 0-25M are preferred and aqueous solutions of about 6-12M sodium hydroxide are especially preferred.

The invention herein disclosed does not require a specific set of temperatures but rather only requires some change in temperature, i.e., $\Delta T$, between the temperature of the electrolyte passing through the cell to generate electric power and the temperature of the cooled electrolyte stream. In general, the $\Delta T$ should preferably exceed 5°–10° F., but the actual values are left to the selection of the application's design engineer.

The maximum concentration of the anode product in the electrolyte is governed by the equation:

$$\Delta G = -RT \ln K \quad (2)$$

wherein K is the equilibrium constant for the process and is usually designated as $K_{sp}$, and $\Delta G$ is the Gibbs free-energy change of the anode product, R is the universal gas constant, and T is the absolute temperature of the anode product. As $\Delta G$ is altered by altering T, so is K altered in an exponential manner, as shown below:

$$K = e^{-G/RT} \quad (3)$$

The equilibrium constant for the system may be approximately related to the actual concentration of the lithium hydroxide by the following equation:

$$K_{sp} = [LiOH] \times [LiOH + AlkOH] \quad (4)$$

wherein the term [LiOH] designates the concentration of lithium hydroxide in the electrolyte in moles/liter, and the term [LiOH+AlkOH] designates the sum of the concentrations of lithium and other alkali metal hydroxides in the electrolyte. As the value of $K_{sp}$ is a fixed value at a given temperature, the sum of the concentrations of LiOH and AlkOH are therefore also fixed. This quadratic sum is also thermally altered:

$$K = e^{-\Delta G/RT} = [LiOH] \times [LiOH + AlkOH] \quad (5)$$

Based upon initial pilot studies, the value of the lithium hydroxide $K_{sp}$ in concentrated aqueous sodium hydroxide at 20° C. is 5.5±1.5 and at 80° C. is 16±1. Using these values, and an illustrative concentration of sodium hydroxide of 5 moles/liter, it was calculated that at 80° C., the electrolyte would dissolve up to 2.2 moles/liter of LiOH, and at 20° C., the same electrolyte would dissolve only about 0.93 moles/liter of LiOH. Thus, a cell 52 run at a temperature of 80° C. and having the electrolyte pass through a heat exchanger 56 at 20° C. would precipitate out of solution approximately 1.27 moles of lithium hydroxide/liter of electrolyte, thus achieving a common objective of electrolyte management techniques, i.e., reducing the concentration of anode reaction product in the electrolyte.

The foregoing detailed description is given for clearness of understanding only, and no unnecessary limitations are to be understood therefrom, as modifications within the scope of the invention will be obvious to those skilled in the art.

I claim:

1. A method of power generation, said method comprising the steps of:
   providing an electrochemical cell including a reactive metal anode, a cathode spaced from said anode to define a reaction zone, and an electrolyte comprising an aqueous solution of the hydroxide of said reactive metal and a common ion agent effective in increasing the thermal coefficient of solubility of said hydroxide in said electrolyte;
   flowing said electrolyte through said reaction zone to generate electric power;
   cooling said electrolyte flowing from said reaction zone to precipitate at least a portion of said reactive metal hydroxide;
   separating at least a portion of said precipitate from said electrolyte; and,
   recirculating said separated electrolyte to said electrochemical cell.

2. The method of claim 1 wherein said reactive metal comprises an alkali metal.

3. The method of claim 2 wherein said alkali metal comprises lithium.

4. The method of claim 1 wherein said common ion agent comprises a water soluble, ionizable compound having a common cation with said reactive metal hydroxide.

5. The method of claim 1 wherein said electrolyte comprises aqueous lithium hydroxide and said common ion agent comprises lithium chloride.

6. The method of claim 1 wherein said common ion agent comprises a water soluble, ionizable compound having a hydroxide anion.

7. The method of claim 6 wherein said electrolyte comprises aqueous lithium hydroxide and said common ion agent comprises aqueous sodium hydroxide.

8. The method of claim 7 wherein said aqueous sodium hydroxide is present in a concentration of about 0-25M.

9. The method of claim 8 wherein said aqueous sodium hydroxide is present in a concentration of about 6-12M.

10. The method of claim 1 wherein said cooling of said electrolyte is effective in reducing the temperature of said electrolyte at least about 5° C. with respect to the temperature of said electrolyte flowing through said reaction zone.

11. The method of claim 1 additionally comprising the step of supplementing said recirculated separated electrolyte with water.

12. A system for power generation comprising: an electrochemical cell including a reactive metal anode, a cathode spaced from said anode to define a reaction zone, an electrolyte comprising an aqueous solution of the hydroxide of said reactive metal and a common ion agent effective in increasing the thermal coefficient of solubility of said hydroxide in said electrolyte;
    means for flowing said electrolyte through said reaction zone to generate electric power;
    means for cooling said electrolyte flowing from said reaction zone precipitate at least a portion of said reactive metal hydroxide;
    means for separating at least a portion of said precipitate from said electrolyte; and,
    means for recirculating said separated electrolyte to said electrochemical cell.

13. The system of claim 12 wherein said reactive metal comprises an alkali metal.

14. The system of claim 13 wherein said alkali metal comprises lithium.

15. The system of claim 12 wherein said common ion agent comprises a water soluble, ionizable compound having a common cation with said reactive metal hydroxide.

16. The system of claim 15 wherein said electrolyte comprises aqueous lithium hydroxide and said common ion agent comprises lithium chloride.

17. The system of claim 12 wherein said common ion agent comprises a compound having a hydroxide anion.

18. The system of claim 17 wherein said electrolyte comprises aqueous lithium hydroxide and said common ion agent comprises aqueous sodium hydroxide.

19. The system of claim 18 wherein said aqueous sodium hydroxide is present in a concentration of about 0-25M.

20. The system of claim 19 wherein said aqueous sodium hydroxide is present in a concentration of about 6-12M.

21. The system of claim 12 wherein said cooling of said electrolyte is effective in reducing the temperature of said electrolyte at least about 5° C. with respect to the temperature of said electrolyte flowing through said reaction zone.

22. The system of claim 12 additionally comprising means for supplementing said recirculating separated electrolyte with water.

* * * * *